(12) United States Patent
Ueda et al.

(10) Patent No.: US 6,946,221 B2
(45) Date of Patent: Sep. 20, 2005

(54) SQUARE BATTERY CONTAINER, METHOD OF MANUFACTURING THE CONTAINER, AND SQUARE BATTERY USING THE CONTAINER

(75) Inventors: Tomomichi Ueda, Osaka (JP); Susumu Kitaoka, Hirakata (JP); Katsuhiko Mori, Katano (JP); Shoji Yamashita, Hirakata (JP); Kazuyuki Higashi, Kadoma (JP); Tadahiro Tokumoto, Hirakata (JP); Masatoshi Hano, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 267 days.

(21) Appl. No.: 10/181,634

(22) PCT Filed: Dec. 26, 2001

(86) PCT No.: PCT/JP01/11503

§ 371 (c)(1),
(2), (4) Date: Jul. 19, 2002

(87) PCT Pub. No.: WO02/052662

PCT Pub. Date: Jul. 4, 2002

(65) Prior Publication Data

US 2003/0003355 A1 Jan. 2, 2003

(30) Foreign Application Priority Data

Dec. 26, 2000 (JP) ........................... 2000-394153
Nov. 7, 2001 (JP) ........................... 2001-341469

(51) Int. Cl.⁷ ............... H01M 2/02; B21D 22/00; B21D 22/20
(52) U.S. Cl. .................. 429/176; 72/72; 72/347; 72/374.9
(58) Field of Search .................. 429/163, 176, 429/185; 264/241; 72/347, 349, 379.4, 420

(56) References Cited

U.S. PATENT DOCUMENTS 3,984,259 A * 10/1976 Rogers et al. ............... 148/690
5,556,722 A * 9/1996 Narukawa et al. ........... 429/163
5,787,752 A * 8/1998 Iwase et al. .................. 72/349
5,827,621 A * 10/1998 Morishita et al. ............ 429/176
5,840,441 A * 11/1998 Hirofumi et al. ............ 429/176
6,007,936 A * 12/1999 Iwase et al. .................. 429/94
6,333,124 B1 * 12/2001 Moriwaki et al. ............ 429/176

FOREIGN PATENT DOCUMENTS

| JP | 60-180058 | | 9/1985 | |
| JP | 01095464 A | * | 4/1989 | ............ H01M/2/02 |
| JP | 06-052842 | | 2/1994 | |
| JP | 06-285580 | | 10/1994 | |
| JP | 06-333541 | | 12/1994 | |
| JP | 07-326331 | | 12/1995 | |
| JP | 09-219180 | | 8/1997 | |
| JP | 10-005906 | | 1/1998 | |
| JP | 10-005907 | | 1/1998 | |
| JP | 10-064487 | | 3/1998 | |
| JP | 11144690 A | * | 5/1999 | ............ B21D/22/20 |
| JP | 2000-015371 | | 1/2000 | |
| JP | 2000-107831 | | 4/2000 | |
| JP | 2000-176588 | | 6/2000 | |
| JP | 2000-182573 | | 6/2000 | |

OTHER PUBLICATIONS

JPO Internet site machine translation of JP 10–005906A.*

* cited by examiner

Primary Examiner—Gregg Cantelmo
(74) Attorney, Agent, or Firm—Jordan and Hamburg LLP

(57) ABSTRACT

A prismatic battery case with high dimensional precision is manufactured, while pursuing an improvement in productivity, with a manufacturing method of a prismatic battery case that includes a first step for molding an intermediate cup body (8) by impact molding a pellet (7) of prescribed shape, and a second step for molding a prismatic battery case (9) with a cross section of substantially rectangular shape by DI processing the intermediate cup body (8). The DI processing conducts drawing and ironing continuously, in one action.

7 Claims, 9 Drawing Sheets

SQUARE BATTERY CONTAINER, METHOD OF MANUFACTURING THE CONTAINER, AND SQUARE BATTERY USING THE CONTAINER

TECHNICAL FIELD

The present invention relates to a prismatic battery case that is used as an outer case for various prismatic batteries, a manufacturing method for manufacturing this prismatic battery case by the DI (Drawing and Ironing) method, and a prismatic battery that is constituted by using the prismatic battery case made by this manufacturing method.

BACKGROUND ART

A lithium-ion rechargeable battery has advantages in that it is not only outstanding in energy density per unit volume, but also in energy density per unit weight, among all the battery systems in practical use at the present time. The energy density per unit volume is used as an index of reduction in size of a battery, and the energy density per unit weight is used as an index of reduction in weight of a battery. The energy density of a battery is determined mainly by the battery active material of the positive and negative electrodes, which constitute the power generation elements. However, reduction in size and weight of the battery case, which accommodates the power generation elements, also becomes important factors. In other words, when a battery case is made thin, it is possible to accommodate more battery active materials into a battery case with the same outside shape, and improve energy density per volume of the battery as a whole. It is also possible to reduce the weight of the battery as a whole, and improve energy density per weight, when the battery case is formed by a light material.

In the trend of the batteries mentioned above, a prismatic battery using a thin prismatic battery case as its outer case is regarded especially important, because it is suited in making an equipment thinner, and also because its efficiency in utilizing space is higher in comparison to cylindrical batteries. For conventional manufacturing methods of the prismatic battery case, there have been adopted the so-called transfer drawing method, which manufactures battery cases with substantially rectangular cross sectional shapes, by repeating deep drawing ten to twenty times with the transfer press machine. There have also been adopted a method that uses impact molding, using aluminum as its material.

However, in the manufacturing method of the prismatic battery case that uses the transfer drawing method, productivity is very low with only about twenty pieces per minute, for example, because the deep drawing has to be repeated ten to twenty times. Furthermore, it has a drawback in that the cost rises, because the die for multistage drawing becomes complicated, in addition to there being many steps. In the transfer drawing method, the thickness of the battery case material is made thinner by repeating the deep drawing, when making it thinner with object of making the capacity larger by raising the energy density per volume. Hence, a drawing-out and pushing-in of the punch is needed the same number of times as the number of drawings, and the diameter of the punch has to be made smaller each time, and the clearance between the punch and the die also has to be made smaller each time. Thus, it needs to be made the same thickness as the side face, from the thick portion at the circumference of the bottom part, and the deep drawing to fulfill this is very difficult. What is worse, the prismatic battery cases made from these processes lack strength at the circumferences of the bottom part, and there is a problem in that it is not possible to maintain a prescribed pressure resisting strength when functioning as a battery.

Japanese Patent Laid-Open Publication No. 2000-182573 discloses a prismatic battery case with its thickness of the plate portions on the longer sides configured to be thicker than the thickness of the corner portions. Japanese Patent Laid-Open Publication No. Hei. 6-52842 discloses a prismatic battery case with its thickness of the plate portions on the longer sides configured to be thicker than the thickness of the plate portions on the shorter sides. These prismatic battery cases are able to prevent expansion and deformation of the plate portions on the longer sides, when the pressure inside the battery rises. However, the capacity to accommodate the power generation elements becomes smaller, because the thickness of the plate portions on the longer sides are made to be thick. Since these portions have the largest surface area, it is not possible to pursue an improvement in energy density per volume or energy density per weight.

Japanese Patent Publication No. Hei. 7-99686 and Japanese Patent Laid-Open Publication No. Hei. 9-219180 disclose a battery case that pursues a reduction in internal resistance when functioning as a battery, by forming fine reinforcements vertical to the bottom face, inside the case, to pursue an increase in contacting area with the power generation elements. However, it is almost impossible to achieve a function that prevents expansion and deformation when the inner pressure of the battery rises, by using these vertical reinforcements of the battery case. Japanese Patent Laid-Open Publication No. Hei. 7-326331 discloses a prismatic battery case that has the thickness of the corner portion configured to be thicker than the thicknesses of the plate portion on the longer side and the plate portion on the shorter side, which are straight-line portions. This prismatic battery case can improve the efficiency to accommodate the power generation elements. However, it cannot prevent the expansion and deformation of the thin plate portions on the longer sides, being reinforced only by the thickened corner portion.

On the other hand, when manufacturing a prismatic battery case using impact molding, the prismatic battery case is formed by crushing a pellet, which serves as a battery case material, with a punch, and pressing and spreading the material out through the gap between the punch and the die, so that it spreads out along the outer peripheral surface of the punch. Productivity is improved in comparison to the transfer drawing method, but the precision of the dimensions is very bad, and the strength at its side portions will be insufficient when it is made thin. When a prismatic battery case is particularly functioning as a battery, and the pressure inside the battery rises, the deformation is bigger than that in a cylindrical battery case, which has a stable shape, and the plate portions on the longer sides with broad areas deform so as to expand into a cylindrical shape, which is a more stable shape. Consequently, there is a fear of the equipment being damaged by a leak of electrolyte solution, or by a short circuit of the power generation elements. For this reason, it is necessary to have a shape that reluctantly sacrifices reduction in thickness and weight, in order to maintain enough strength to positively prevent a deformation when the pressure inside the battery rises, in manufacturing a prismatic battery case by impact molding. Thus, it is not possible to pursue an improvement in energy density per volume or energy density per weight, in this case.

For other manufacturing methods of the prismatic battery case, Japanese Patent Laid-Open Publication No. Hei. 6-333541 discloses a method, in which a prismatic tube and a bottom plate are molded separately, and the bottom plate is joined hermetically to the bottom part of the prismatic tube by laser beam welding. However, in this manufacturing method, the number of steps are not reduced so much in comparison to the transfer drawing method, and troublesome operations intervene, such as the step that accurately positions the prismatic tube and the bottom plate, or the step that conducts the laser beam welding. Accordingly, it is not possible to pursue an improvement in productivity. Further, it is not possible to obtain a prismatic battery case that satisfies both of the contradicting requirements, high energy density by reduced thickness and weight, and pressure resisting strength that prevents deformation during a rise in inner pressure within the battery, in this manufacturing method.

A DI method is used for the manufacturing method of a battery case of a cylindrical battery. This DI method makes it possible to manufacture a battery case that maintains a prescribed pressure resisting strength, while making it possible to pursue an improvement in energy density per volume by reducing thickness. The DI method also makes it possible to manufacture with high productivity. This DI method is a method that conducts drawing and ironing on an intermediate cup body continuously, and in one action, and a battery case with a prescribed cylinder shape is manufactured using this method. This intermediate cup body is manufactured by deep drawing of a pressing machine. There are following advantages in this method compared to the transfer drawing method, and the extent of its use is enlarging. The advantages include an improvement in productivity with the reduction in the number of steps, an improvement in dimensional precision such as thickness, an improvement in energy density corresponding to the reduction in weight and the increase in capacity, which are both due to a reduction in thickness of the peripheral side walls of the case, and a reduction in stress corrosion.

Therefore, it is conceivable to manufacture a prismatic battery case using the DI method mentioned above. When manufacturing a cylindrical battery case using the DI method, it is processed between two geometrically similar shapes from an intermediate cup body having a cross section of circular shape to a battery case having a cross section of circular shape. The material flows uniformly during the processing, and deformation is done smoothly, because the thickness of the whole peripheral wall is reduced uniformly, in the ironing step of the DI processing. In contrast, when manufacturing a prismatic battery case using the DI processing, it is processed between two geometrically non-similar shapes from an intermediate cup body having a cross section of circular shape to a battery case having a cross section of substantially rectangular shape. This makes the flow of material non-uniform, and thickness deviation, shearing, and cracks all caused by eccentricity are easily induced. This also makes processing difficult in correspondence to the concentration of stress, because the processing stress acting during the molding is not uniform, and molding with high precision also becomes difficult, because it is not possible to conduct a stable processing. In particular, cracks and ruptures are liable to be induced at the plate portions on the shorter sides, which have small surface areas, and there arises a problem that portions with distorted shapes are generated.

Japanese Patent Laid-Open Publication No. Hei. 10-5906 also discloses a manufacturing method of a prismatic battery case. In this method, a first intermediate cup body is molded by drawing, and then a second intermediate cup body is molded by repeating the drawing on the peripheral side wall portion of the first intermediate cup body, plural times. Lastly, the second intermediate cup body is processed by impact extrusion (impact molding) to adjust the thickness to be a prescribed value at the bottom plate portion and the corner portion. However, the number of steps increases in this manufacturing method, with drawing, multi-stages of DI processing, and impact molding being necessary. Adjustment of the thickness at the bottom plate portion and the peripheral side wall portion also becomes difficult, because the thickness at the bottom plate portion is adjusted to be a prescribed value by impact molding in the last step. It is not possible to obtain a prismatic battery case having a shape with each of the portions conforming to prescribed thicknesses, with high precision. As opposed to this method, the present applicant has already proposed a manufacturing method that can manufacture a prismatic battery case that has high energy density, and a prescribed pressure resisting strength using the DI method. In the first step of this manufacturing method, a hoop material is punched and a battery case material 1 of oval shape is formed, as shown in FIG. 5A. Then, this battery case material 1 is processed by deep drawing to mold a first intermediate cup body 2 with a cross section of substantially elliptical shape similar to the circular shape, as shown in FIG. 5B. After that, the first intermediate cup body 2 is subjected to multi-stages of continuous redrawing of the second step, which uses drawing press machines. After being subjected to the second step, this first intermediate cup body 2 is molded into a second intermediate cup body 3, which has a cross section of substantially elliptical shape, and whose ratio of the minor-axis/major-axis is smaller than that of the cross sectional shape of the first intermediate cup body 2, as shown in FIG. 5C. Lastly, the second intermediate cup body 3 is subjected to the DI processing, which conducts drawing and ironing in a continued state, in the third step. This second intermediate cup body 3 is molded into a prismatic battery case 4, which has a shape with a cross section of substantially rectangular shape, and a shape that has the thickness at the plate portion on the shorter side 4a thicker than the thickness at the plate portion on the longer side 4b, as shown in FIG. 5D.

With this manufacturing method, it is possible to manufacture a prismatic battery case 4 of desired shape in three steps. Productivity is improved remarkably in comparison to the conventional transfer drawing method, and it is also possible to obtain a prismatic battery case 4 with high dimensional precision in thickness or the like by using the DI method. However, there are problems to be solved in this manufacturing method. That is, ruptures and cracks are induced, when attempting to manufacture a prismatic battery case by directly DI processing the first intermediate cup body 2. This is because an attempt is made to DI process the cup body 2 with a cross section of substantially elliptical shape similar to the circular shape into a case with a cross section of substantially rectangular shape. For this reason, an intervention of the second step is needed. In this second step, the dimension in the minor axis direction is gradually shortened by drawing, and the material of the deformation corresponding to this drawing is made to flow so that it escapes in the major axis direction. Moreover, the major axis side is modified by being shortened to a prescribed dimension. Consequently, the number of steps increases, because multi-stages of redrawing are to be conducted in the second step.

An object of the present invention is to provide a prismatic battery case having high energy density and a prescribed pressure resisting strength, and a prismatic battery using this prismatic battery case. It is also an object of the invention to provide a manufacturing method of the prismatic battery case, which makes it possible to obtain this prismatic battery case with high dimensional precision, and with ease, while reducing the number of steps by using the DI method and pursuing an improvement in productivity at the same time.

DISCLOSURE OF THE INVENTION

The present invention made to achieve the above-mentioned objects is a manufacturing method of a prismatic battery case, characterized by having a first step for molding an intermediate cup body by impact molding a pellet of a prescribed shape, and a second step for molding a prismatic battery case with a cross section of substantially rectangular shape by DI processing the intermediate cup body, the DI processing conducting drawing and ironing continuously, and in one action.

With the manufacturing method described above, an intermediate cup body with a cross section of substantially rectangular shape is manufactured in one action by impact molding that is able to manufacture a random shape in one action. This intermediate cup body is then processed into a prismatic battery case by the DI method. Productivity is improved remarkably with the number of steps reduced significantly, because there is only the first step and the second step, both of which are able to mold with one stroke of movement of the punch. It is also possible to manufacture a prismatic battery case of desired shape easily and with certainty, and the precision of dimensions such as thickness is improved, because the intermediate cup body is DI processed. Consequently, it is possible to manufacture a prismatic battery case with sufficient pressure resisting strength, while making the thickness as thin as possible.

Another aspect of the present invention is a prismatic battery case, characterized in that the case is formed by impact molding a pellet of a prescribed shape to make an intermediate cup body to be a prismatic shape with a bottom, and having a cross section of rectangular shape that has thicknesses of a plate portion on the longer side, a plate portion on the shorter side, and a corner portion to have sizes ascending in that order, and subjecting the intermediate cup body to DI processing which includes drawing and ironing continuously in one action to have a shape with a cross section of rectangular shape, and the thicknesses of the plate portion on the longer side, the plate portion on the shorter side, and the corner portion to have sizes ascending in that order.

When the pressure inside the battery rises, the force that tries to expand and deform the plate portion on the longer side in the outward direction, and the force that tries to sink the plate portion on the shorter side in the inward direction are both acted upon the case simultaneously. However, with this constitution, the plate portion on the shorter side, which is thicker than the plate portion on the longer side, effectively prevents the plate portion on the longer side from expanding and deforming in the outward direction. The plate portion on the longer side tries to expand and deform in the outward direction using the corner portion just like a fulcrum. Hence, the corner portion, which is made even thicker than the plate portion on the shorter side, effectively prevents the plate portion on the longer side from expanding and deforming in the outward direction. Consequently, although the thickness of the plate portion on the longer side is configured to be the thinnest, expansion and deformation of the plate portion on the longer side in the outward direction with the rise in pressure within the battery is prevented and sufficient pressure resisting strength is maintained. The capacity to accommodate the power generation elements is made bigger by having the thickness of the plate portions on the longer sides, which have the largest surface area among the peripheral wall portions, made the thinnest. In particular, when forming convex protruding portions of lattice form on the plate portion on the longer side, the thickness at the plate portion on the longer side can be made as thin as possible, because expansion and deformation of the case is effectively restrained by the convex protruding portions. Even when the thickness of the corner portion is made thicker by being made a shape protruding in expansion in the inward direction for a distance that is the same as the gap generated between itself and an electrode group to be accommodated in the battery case, there is no reduction in the capacity to accommodate the electrode group.

Another aspect of the invention is a manufacturing method of a prismatic battery case, characterized by having a first step for molding an intermediate cup body by impact molding a pellet of a prescribed shape, and a second step for molding a prismatic battery case with a plurality of convex protruding portions formed in lattice form arrangement. These convex protruding portions protrudes in expansion and extends in linear form on the inner surface of the case and on at least the plate portions on the longer sides, so as to be thick in a thickness direction of the case. This is done by subjecting the intermediate cup body to the DI processing using a DI punch, which conducts drawing and ironing continuously, in one action. The DI punch has processing grooves formed in lattice form, on at least surfaces on the longer sides of a prismatic plate with a cross section of rectangular shape.

With this manufacturing method, productivity is improved remarkably by having the number of steps reduced significantly. It is also possible to manufacture a prismatic battery case of desired shape easily and with certainty, and the precision of dimensions such as thickness is improved, because the intermediate cup body is DI processed. It is possible to manufacture a prismatic battery case with sufficient pressure resisting strength, while making the thickness as thin as possible. In the DI processing of the second step, a portion of the material on the inner surface side of the intermediate cup body gets into the processing grooves of the DI punch, while being subjected to plastic deformation. This makes the material on the inner surface side of the intermediate cup body move in unity with the DI punch, because it is put in a state with resistance added between itself and the DI punch. This also makes the material on the outer surface side of the intermediate cup body to be ironed mainly by the die. Consequently, it is possible to make the flow of material smoother, by restraining the material surplus phenomenon between the die and the DI punch from happening. It is also possible to restrain the processing speed at the plate portion on the longer side, and make the processing speed constant as a whole, when the convex protruding portions are formed on only the plate portion on the longer side of the prismatic battery case. As a result, it is possible to manufacture a prismatic battery case having a uniform thickness, without any corrugated shape on either the inner surface or the outer surface of the case. The manufactured prismatic battery case is made to be as thin as possible, but it has very strong pressure resisting strength, because it has strength to effectively restrain an expanding deformation, with the lattice formed convex protruding portions functioning just like reinforcement cross-pieces.

Another aspect of the invention is a prismatic battery, characterized in that a power generation element composed of an electrode group and electrolyte solution is accommodated inside a prismatic battery case manufactured by the above-mentioned manufacturing method, and an opening of this case is liquid sealed with a sealing plate.

With this constitution, the prismatic battery case is manufactured in a small number of steps, and productivity is improved accordingly. The prismatic battery case also has sufficient pressure resisting strength, while pursuing an improvement in energy density per volume, by making the thickness of the prismatic battery case, which is formed with high precision, to be as thin as possible.

With this constitution, the plate portion on the longer side, which is liable to expand and deform when the pressure within the battery rises, is restrained from expanding and deforming by the convex protruding portions that function just like reinforcement crosspieces. Thus, it becomes possible to form the thickness to be as thin as possible, to be less than 0.25 mm for example, and the capacity to accommodate the power generation elements becomes larger, and it is possible to pursue high energy density.

BEST MODE FOR CARRYING OUT THE INVENTION

Preferred embodiments of the present invention will be described in detail hereinafter, with references to the drawings. First, manufacturing steps in a manufacturing method of a prismatic battery case of a first embodiment will be explained briefly. In this manufacturing method of the prismatic battery case, a pellet 7, which is the battery case material, is formed to be an oval shape as shown in FIG. 3A, or substantially a rectangular shape as shown in FIG. 3C, in the first step shown in the schematic longitudinal sectional views FIG. 1A through FIG. 1C. Both of these shapes are plan view shapes corresponding to the outline of the cross sectional shape of the prismatic battery case to be manufactured. An intermediate cup body 8 with a cross section of substantially elliptical shape with a small minor-axis/major-axis ratio, as shown in FIG. 3B, or an intermediate cup body 8 with a cross section of substantially rectangular shape, as shown in FIG. 3D, is formed by impact molding this pellet 7. A prismatic battery case 9 of desired shape is manufactured by DI processing this intermediate cup body 8 in the second step. The prismatic battery case 9 is shown in a partially cutaway perspective view in FIG. 3E, and the second step is shown in a schematic longitudinal sectional view in FIG. 2. The first and second steps will be described in detail and in sequence, hereinafter.

When the pellet 7 is made an oval shape, it is possible to prevent a crushing of shape caused by the stress induced during impact molding, and to mold the intermediate cup body 8 into a desired shape, with certainty. On the other hand, when the pellet 7 is made substantially a rectangular shape, it is possible to form a intermediate cup body 8 with an outer shape close to the prismatic battery case 9 to be formed. Thus, the burden of processing is reduced, when DI processing this intermediate cup body 8 to manufacture a prescribed prismatic battery case 9.

Figure 1A:
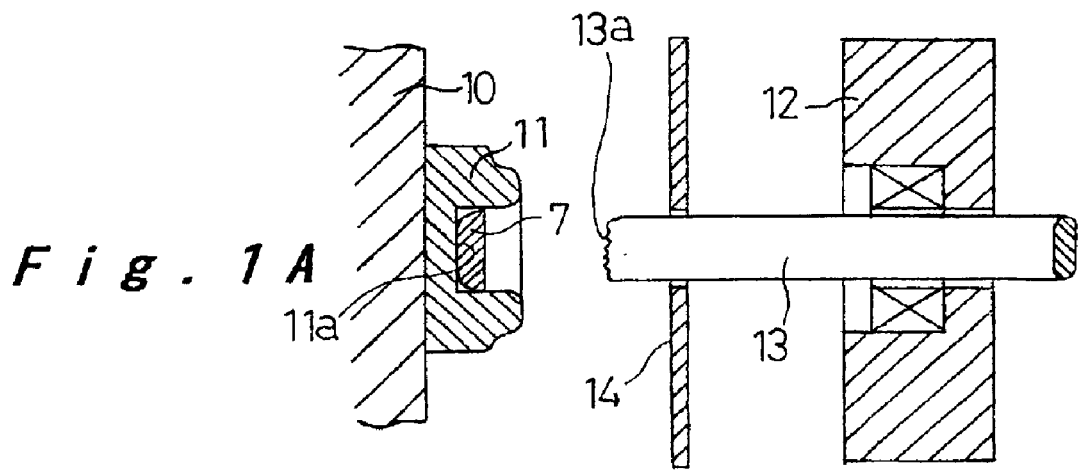
FIG. 1A through FIG. 1C are schematic longitudinal sectional views showing a first step in a manufacturing method of a prismatic battery case according to a first embodiment of the present invention, in sequential order.
Figure 1B:
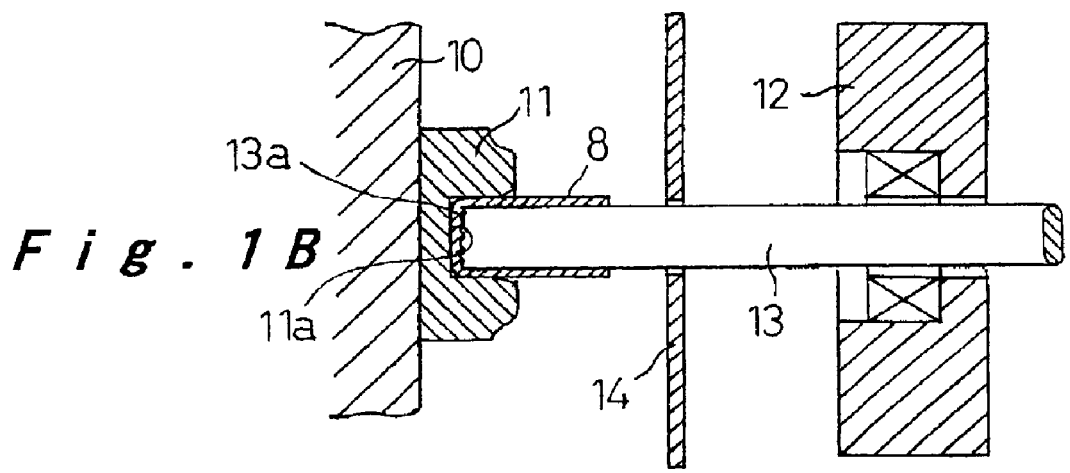
Figure 1C:
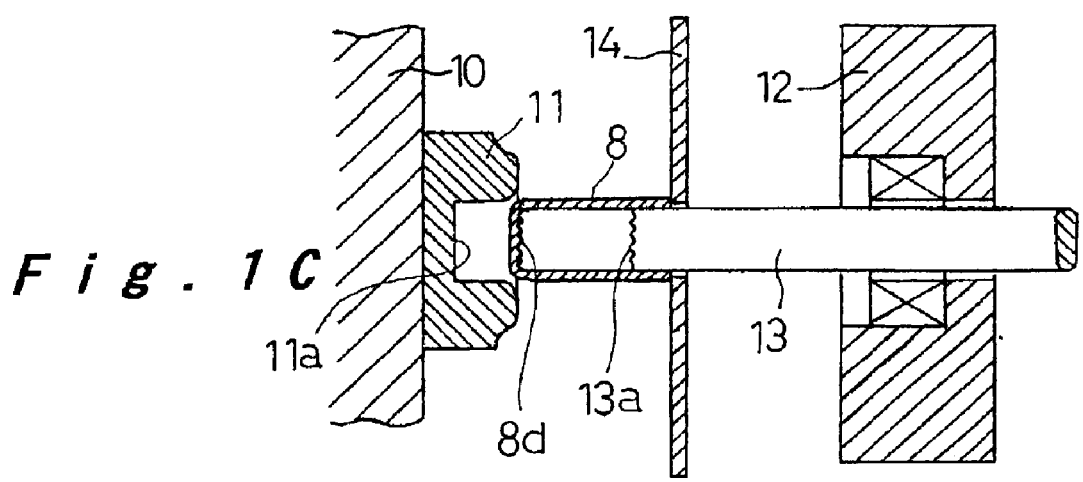

FIG. 1A through FIG. 1C shows a pressing machine that conducts impact molding in the first step, and a die 11 is fixed to a die holder 10 in this machine. A pellet 7, which is the battery case material shown in FIG. 3A or 3C, is supplied to a processing hole 11a on this die 11. Aluminum or aluminum alloy is used as the material for the pellet 7, because weight reduction of the prismatic battery case 9 to be manufactured is pursued, and because it has malleability that is required by the impact molding in this first step. It is especially preferred that the aluminum alloy includes manganese. To be specific, an aluminum alloy with a chemical composition of A1000 through A5000 in H4000 of the JIS standard is used. This type of aluminum alloy has malleability very much suited for impact molding, and it is also possible to achieve a preferable work hardening after the molding. It is more preferable to use an aluminum alloy with a chemical composition No. A3000, and a battery case with excellent characteristics is achieved by this alloy.

The pellet 7 is formed into an oval shape with its plan view shape made to be an ellipse close to the cross sectional shape of the prismatic battery case 9 to be manufactured, as shown specifically in FIG. 3A, or into substantially a rectangular shape, as shown in FIG. 3C, by punching a battery case material composed of aluminum or aluminum alloy described above. Annealing treatment is given to the pellet 7 with such a shape for half an hour to three hours (preferably around one hour) at temperatures of 250 to 400 degrees centigrade. This annealing treatment can be given to the battery case material before punching the pellet 7, but it is preferred that it be given to the pellet 7 obtained by the punching.

When the pellet 7 is inserted into the processing hole 11a of the die 11, a punch 13 held by a punch holder 12 is moved near to the die 11 side, and then driven into the processing hole 11a of the die 11. This makes the pellet 7 crushed by the punch 13, and it is cast so as to stretch up along the outer peripheral surface of the punch 13, while being spread out so as to be pushed into the gap between the punch 13 and the wall of the processing hole 11a.

In this impact molding, a jagged surface 13a formed on the front-end face of the punch 13 bites into the pellet 7, when it comes into contact with the pellet 7. This holds the punch 13 at a prescribed relative location with regard to the pellet 7 without any deviation in location, in the subsequent impact molding processes. As a result, the material of the pellet 7, which deforms in correspondence to the progress of the processing, flows uniformly and smoothly to the circumference of the punch 13. This makes it possible to mold a high precision intermediate cup body 8 without any thickness deviation.

It is preferred that the jagged surface 13a be formed as a mesh form like a knurling. The jagged surface 13a is not always necessary, and it is possible to obtain an intermediate cup body of substantially the desired shape by impact molding with a punch of flat front-end face. When the punch 13 has finished moving the prescribed stroke, an intermediate cup body 8 is molded, having the shape shown in FIG. 3B or FIG. 3D. There is a jagged surface 8d formed on the bottom face of this intermediate cup body 8, with the jagged surface 13a of the punch 13 transcribed onto it. This intermediate cup body 8 is obtained by impact molding the pellet 7 which has been given the annealing treatment to have good extensibility. Thereby, the intermediate cup body 8 has even less dispersion in the thickness of its side face portions.

Figure 5A:
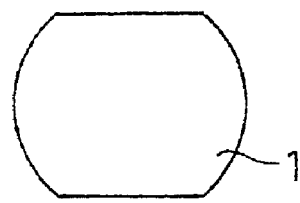
FIG. 5A is a plan view of a battery case material according to a manufacturing method of a conventional prismatic battery case.
Figure 5B:
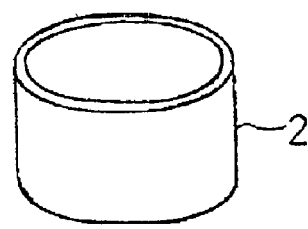
FIG. 5B is a perspective view of a first intermediate cup body.
Figure 5C:
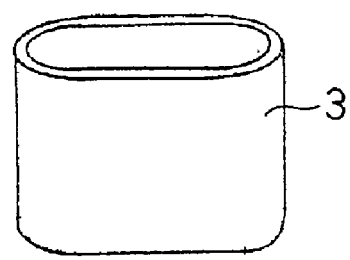
FIG. 5C is a perspective view of a second intermediate cup body.

The intermediate cup body 8 is substantially the same shape as the second intermediate cup body 3 shown in FIG. 5C, and has a shape with a cross section of substantially a desired ellipse or rectangular shape. That is, in this manufacturing method, an intermediate cup body 8 equal to the second intermediate cup body 3 is molded in one action by conducting the impact molding of the first step. This second intermediate cup body 3 was manufactured by being subjected to the first step that conducts the deep drawing, and the second step that conducts the redrawing in the manufacturing method of the prior application mentioned before. However, this intermediate cup body 8 is formed in only one step, which is the impact molding. Thus, there are some distorted deformations, but these can be sufficiently modified by the DI method in the second step, which will be mentioned hereinafter, and there is no problem whatsoever.

Then, the punch 13 that has finished moving the prescribed stroke parts from the die 11, and moves towards its original position as shown in FIG. 1C. At this moment, the molded intermediate cup body 8 is pulled out of the processing hole 11a by the punch 13 in a state adhering to the punch 13, and then detached from the punch 13 by a stripper 14.

When conducting DI processing in the second step, which will be mentioned hereinafter, a stress that makes the material try to gather in the center direction is acted on, and the obtained battery case tends to become a crushed shape. In this embodiment, in contrast to this phenomenon, an intermediate cup body 8 with a cross section of substantially an ellipse or rectangular shape is formed by impact molding a pellet 7 that is formed to be an oval or rectangular shape beforehand, and then this intermediate cup body 8 is DI processed. Thereby, a battery case of desired shape is molded with the crushing due to stress being prevented, or the burden of processing reduced.

The thickness of the intermediate cup body 8 can be configured without any limitation by configuring a gap between the punch 13 and the wall of the processing hole 11a of the die 11. In an intermediate cup body 8 having a thin side face portion, the burden in processing during the DI processing in later steps is small, but the controlling to obtain a battery case of a prescribed thickness becomes difficult. Conversely, in an intermediate cup body 8 having a thick side face portion, the controlling to obtain a battery case 9 of a prescribed thickness is easy, but the burden in processing during the DI processing becomes bigger. In this situation, when the intermediate cup body 8 is formed to have a shape with the following ratios, the burden in processing during the DI processing of this intermediate cup body 8 is reduced and the controlling to obtain a battery case 9 of a prescribed thickness becomes easy. The ratio of the thickness of the plate portion on the longer side to the thickness of the plate portion on the bottom is made to be 0.6 to 1.3, and the ratio of the thickness of the plate portion on the shorter side to the thickness of the plate portion on the bottom is made to be 1.0 to 1.8. In particular, it is possible to prevent an occurrence of problems such as pulling apart of the plate portion on the longer side.

Even when the intermediate cup body 8 is obtained by impact molding a battery case material or a pellet 7 that has been given the annealing treatment mentioned above, it is preferred that the intermediate cup body 8 be given annealing treatment again before DI processing. This annealing treatment is performed for about half an hour to three hours (preferably around one hour), at temperatures of 250 to 400 degrees centigrade. With this treatment, the intermediate cup body 8 has the work hardening induced during the impact molding relieved, and has the extensibility of the material made better, and it is made into a state suited for the DI processing in the next step.

Figure 2:
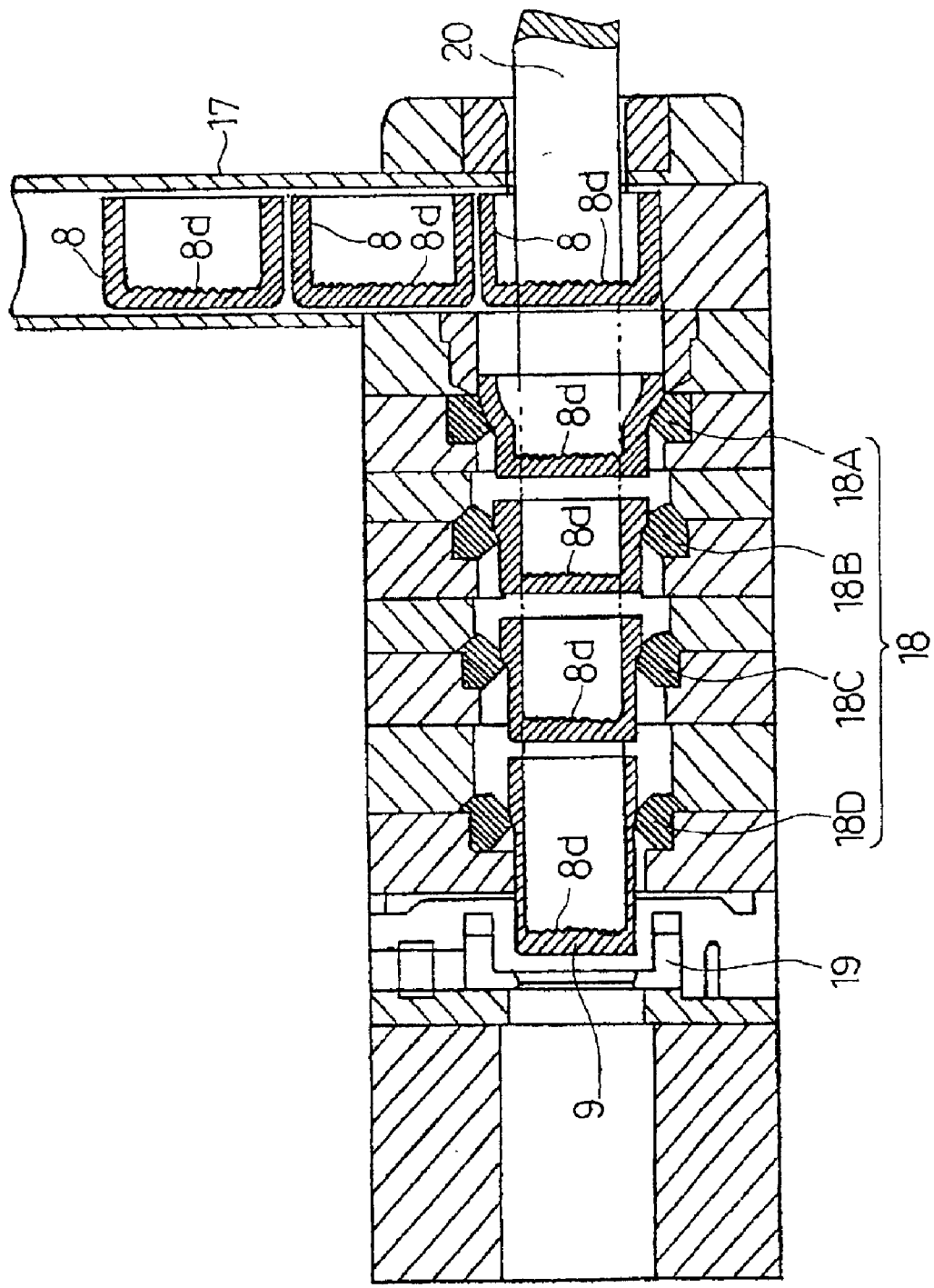
FIG. 2 is a schematic longitudinal sectional view of a second step in the same embodiment.
Figure 3A:
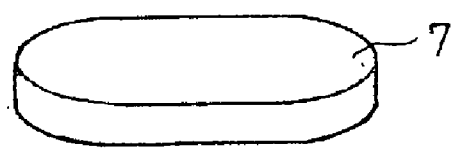
FIG. 3A and FIG. 3C are perspective views of pellets in the embodiment.
Figure 3C:
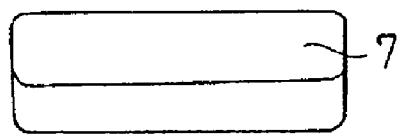
Figure 3B:
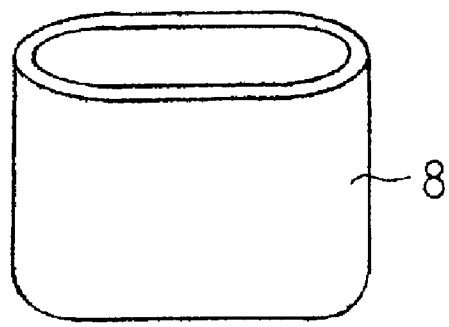
FIG. 3B and FIG. 3D are perspective views of intermediate cup bodies.
Figure 3D:
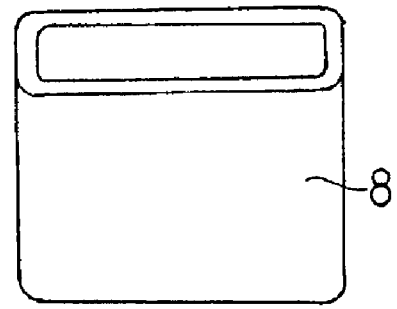

This intermediate cup body 8 becomes a prismatic battery case 9 of desired shape by being subjected to the DI processing in the second step, shown in FIG. 2. This DI processing conducts one stage of drawing and three stages of ironing all in one action, using a drawing and ironing machine. This drawing and ironing machine is constituted by being provided with an intermediate product transfer unit 17, a die mechanism 18, a stripper 19, and the like. There is a drawing die 18A, a first ironing die 18B, a second ironing die 18C, and a third ironing die 18D arranged and installed on the die mechanism 18. These dies 18A through 18D are arranged in series, so that they are concentric with the central axis of the DI punch 20.

The intermediate product transfer unit 17 transfers intermediate cup bodies 8 to the molding location, in succession. The intermediate cup body 8 transferred and positioned to the molding location is drawn by the drawing die 18A, so as to have its shape corresponding to the outer shape of the DI punch 20. This is done by the pushing movement of the DI punch 20 driven by a flywheel (not shown). The cup body that has finished passing through this drawing die 18A is deformed to have the dimensions in the major axis direction and the minor axis direction to be a little smaller than the intermediate cup body 8, and also deformed to have a long body portion. It is also molded to have its cross section substantially an elliptical shape, close to the substantially rectangular shape of the cross section of the desired prismatic battery case 9, but there is no change in its thickness.

Then, the cup body that has finished passing through the drawing die 18A is subjected to the first stage of ironing by the first ironing die 18B, with the progress of the pushing movement of the DI punch 20. This makes the peripheral side portion flatten out and makes its thickness thinner, and also increases the hardness by work hardening. The cup body that has finished passing through the first ironing die 18B is successively subjected to the second and third stages of ironing conducted by the second ironing die 18C and the third ironing die 18D, with the further progress of the pushing movement of the DI punch 20. The second ironing die 18C has a processing hole smaller than the first ironing die 18B, and the third ironing die 18D has a processing hole even smaller than the second ironing die 18C. This makes the peripheral wall portion flatten out in succession, and makes the thickness even thinner, and also increases the hardness by work hardening. When the cup body finishes passing through the third ironing die 18D, a prismatic battery case 9 of desired shape is completed. In this case, DI processing is conducted on an intermediate cup body 8 of substantially elliptical shape with a small minor-axis/major-axis ratio. In other words, it is conducted on an intermediate cup body 8 with its cross section made an elliptical shape, close to a rectangle. Consequently, it is possible to DI process the intermediate cup body 8 in a reasonable way, and to manufacture a prismatic battery case 9 of desired shape with stability.

This prismatic battery case 9 is detached from the drawing and ironing machine by the stripper 19. Then, its upper side portion (lug portion) is cut off because it has become a somewhat distorted shape through each of the processings, and becomes the prismatic battery case 9 shown in FIG. 3E. There is still the jagged surface 8d left on the bottom face of this battery case 9, which is formed during impact molding.

In the manufacturing method of the prismatic battery case 9 of this embodiment, a prismatic battery case 9 of desired shape is manufactured by the first step and the second step. This first step manufactures an intermediate cup body 8 in one step of impact molding. This intermediate cup body 8 is equal to the second intermediate cup body 3 which is manufactured by being put through the first step of deep drawing, and the second step composed of multi-stages of redrawing in the manufacturing method of the prismatic battery case in the above-mentioned prior application. The second step is the DI processing, which is excellent in production speed. Consequently, there are advantages in this method over the manufacturing method of the prior application, in which the number of steps is reduced substantially to improve the productivity remarkably, a prismatic battery case 9 of desired shape is manufactured easily, because the DI processing is done to an intermediate cup body 8 with a cross section made substantially an elliptical shape close to a rectangle, and the dimensional precision of thickness or the like is improved by the DI processing which molds with one stroke of action of the DI punch 20.

Figure 3E:
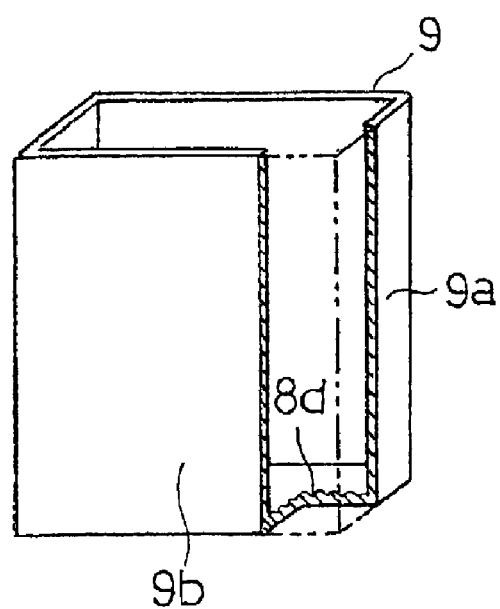
FIG. 3E is a perspective view of a prismatic battery case.
Figure 5D:
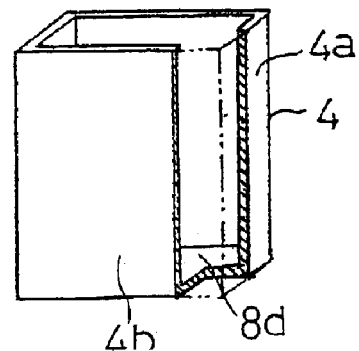
FIG. 5D is a partially cutaway perspective view of the prismatic battery case.

The prismatic battery case 9 obtained by this embodiment, shown in FIG. 3E, has a uniform thickness entirely. However, the impact molding in the first step of this embodiment has excellent shape selectivity in which it is possible to easily mold into a random shape by configuring the gap between the punch 13 and the wall of the processing hole 11a of the die 11. Accordingly, it is also possible to form the case into a shape with a cross section substantially rectangular and with the thickness at the plate portion on the shorter side 4a made thicker than the thickness at the plate portion on the longer side 4b, like the prismatic battery case 4 obtained by the manufacturing method of the prior application, shown in FIG. 5D.

Figure 3F:
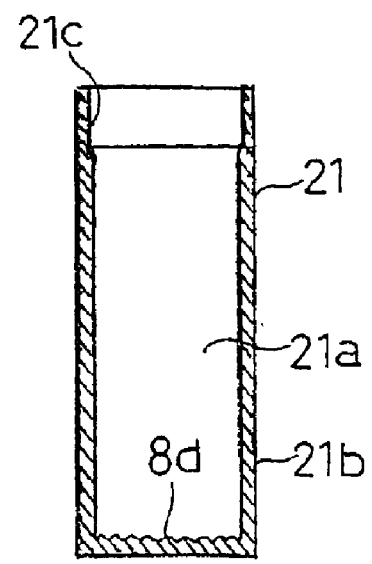
FIG. 3F is a longitudinal sectional view of another prismatic battery case.

It is also possible to manufacture a prismatic battery case 21 with a shape shown in the longitudinal sectional view of FIG. 3F, with ease. This prismatic battery case 21 has a thin wall portion 21c, which has a wall about ten percent thinner than the other portions, formed at the circumference of the opening on the plate portion on the shorter side 21a, and on the plate portion on the longer side 21b, namely, at the circumference of the sealing portion, when it is made into a prismatic battery. This thin wall portion 21c can be formed by making a prescribed portion of the DI punch 13 of the drawing and ironing machine in the second step to have a shape expanding slightly to a larger diameter.

Specific examples according to the manufacturing method of the prismatic battery cases 9 and 21 of the embodiments described above will be explained next. First, the measured values when the first step was conducted will be shown. The pellet 7 is an oval shape using aluminum as its material, and the thickness is 3.6 mm, the length of the major axis is 30.9 mm, and the length of the minor axis is 9.8 mm. The intermediate cup body 8 has a thickness of 0.4 mm, the length of the major axis is 31.1 mm, and the length of the minor axis is 10.0 mm. The prismatic battery case 9 manufactured by being subjected to the second step, shown in FIG. 3E, has a thickness of 0.2 mm or less at the plate portion on the shorter side 9a, and at the plate portion on the longer side 9b. The thickness of the bottom plate portion is 0.4 mm, the length of the longer side is 29.5 mm, and the length of the shorter side is 5.3 mm. Since it went through this kind of transformation in shape, it was possible to manufacture a prismatic battery case 9 with almost no distorted deformation, and with high dimensional precision, smoothly.

Specific examples according to the manufacturing method that manufactured similar prismatic battery cases using pellets with other shapes will be explained. First, the measured values when the first step was conducted will be shown. The pellet is an oval shape with a cross section of substantially rectangular shape with rounded portions at the four corners of the rectangle, and using aluminum as its material. The thickness of the pellet is 3.6 mm, the length of the longer side is 29.5 mm, and the length of the shorter side is 5.0 mm. The intermediate cup body has a thickness of 0.4 mm, the length of the longer side is 30.0 mm, and the length of the longer side is 5.5 mm.

Then, a battery case which is similar to the prismatic battery case 9 shown in FIG. 3E was manufactured by being subjected to the second step. This battery case has a thickness of 0.2 mm at the plate portion on the shorter side 9a, and at the plate portion on the longer side 9b. The thickness at the bottom plate portion is 0.4 mm, the length of the longer side is 29.5 mm, and the length of the shorter side is 5 mm. Since it went through this kind of transformation in shape, it was possible to manufacture a prismatic battery case with almost no distorted deformation, and with high dimensional precision, smoothly. In particular, it has advantages such as being able to restrain an expansion of the bottom face in the DI process, or having small bending and drawing rates, making it easy to conduct drawing in the DI process. This is made possible because the case is formed from a material with a shape having a cross section of substantially rectangular shape and rounded portions at the four corners of the rectangle.

Figure 4:
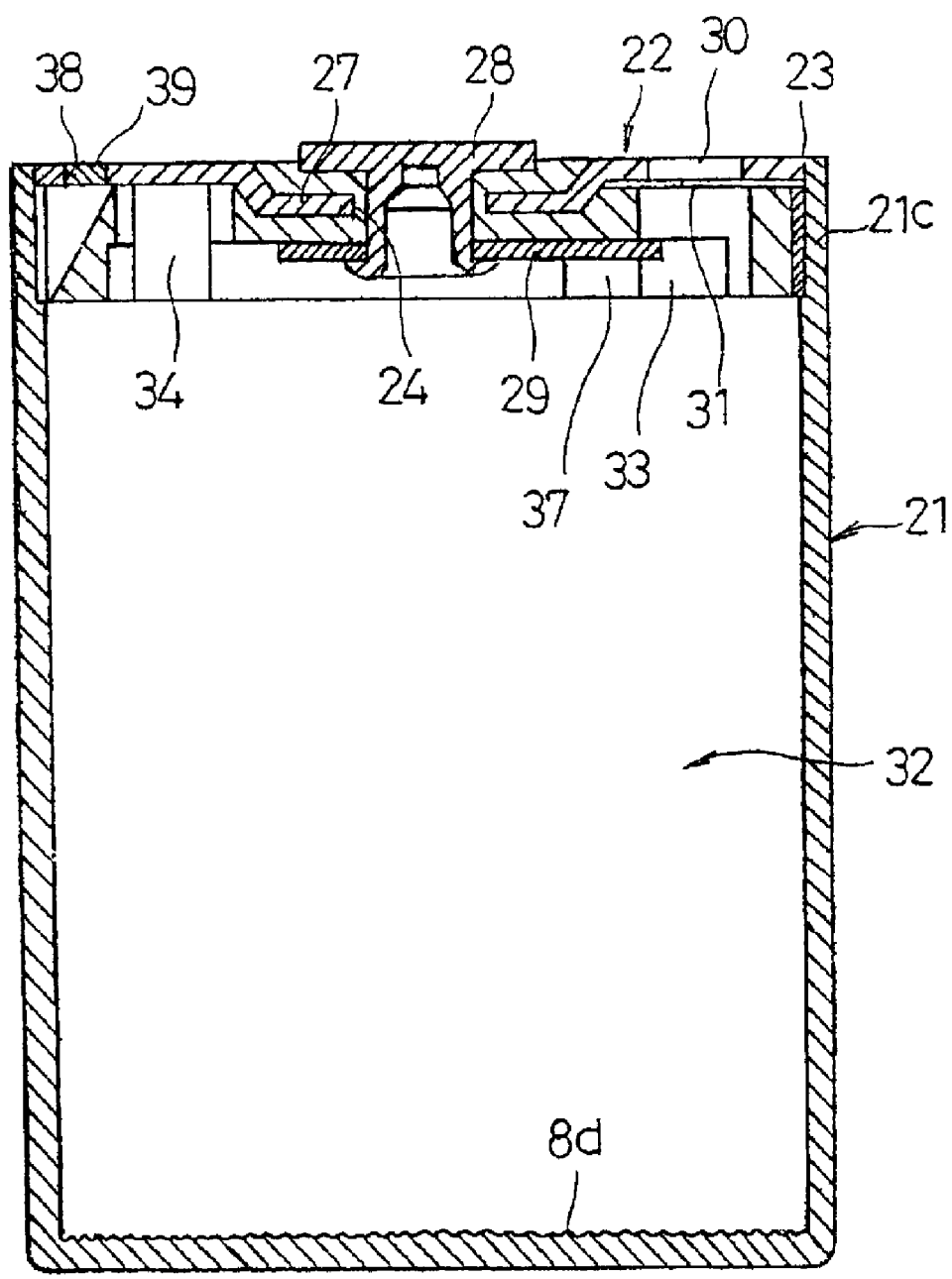
FIG. 4 is a longitudinal sectional view showing a prismatic battery constituted by using the prismatic battery case of the embodiment.

FIG. 4 is a longitudinal sectional view showing a prismatic lithium ion rechargeable battery that is constituted by using the prismatic battery case 21 shown in FIG. 3F. This prismatic battery has a sealing plate 22 attached to the peripheral edge inside the opening of the prismatic battery case 21 by intermeshing. This intermeshing portion 23 between the prismatic battery case 21 and the sealing plate 22 is unified by laser beam welding, and sealed airtight and liquid tight. The sealing plate 22 is formed to be a shape with its central portion sinking inside. It also has a through hole 24 formed thereon. A gasket 27 made of synthetic resin coated with a sealant composed of a mixture of blown asphalt and mineral oil is mounted in unity onto this through hole 24. This synthetic resin gasket 27 is resistant to electrolyte solution and has electricity insulating characteristics.

There is a rivet 28 made of nickel or nickel-plated steel fastened to the gasket 27. The rivet 28 also serves as the negative electrode terminal. This rivet 28 is inserted into the central portion of the gasket 27, and fastened by having its front-end portion caulked with a washer 29 intermeshed on its lower part, and is closely adhered to the gasket 27 in a liquid tight and airtight state. This gasket 27 of this embodiment is formed in unity with the sealing plate 22 by injection molding. There is an exhaust hole 30 of substantially elliptical shape provided between the rivet 28 serving as the negative electrode terminal, and the outer edges on the major axis side of the sealing plate 22. This exhaust hole 30 is obturated by an aluminum foil 31, which is attached by pressure and unified to the inner surface of the sealing plate 22 to form an explosion proof safety vent.

There is an electrode group 32 accommodated in the accommodating unit for the power generation elements in the prismatic battery case 21. This electrode group 32 is formed by having one positive electrode plate (not shown) and one negative electrode plate (not shown) wound around with a separator 33 composed of microporous polyethylene film interposed therebetween. This electrode group 32 is wrapped around its outermost circumference by the separator 33, and its cross section is formed to be an elliptical shape. A positive electrode lead 34 of the electrode group 32 is connected to the inner surface of the sealing plate 22 by spot welding of laser beam, and a negative lead plate 37 of the electrode group 32 is connected to the washer 29 by resistance welding.

A liquid pouring hole 38 is provided in the sealing plate 22, and a prescribed amount of organic electrolyte solution is poured through this injection hole 38. After the pour, the liquid pouring hole 38 is covered by attaching and fixing a cover plate 39, and then the cover plate 39 and the sealing plate 22 are welded together by laser beam to complete the prismatic battery. The electrode group 32 was explained for the case in which it was wound around to make a cross section of elliptical shape. However, this prismatic battery case 21 can be applied to a case in which a prismatic battery is constituted by accommodating an electrode group constituted by stacking a plurality of positive electrode plates and a plurality of negative electrode plates with separators interposed therebetween, as in a common prismatic cell.

This prismatic battery is constituted by using the prismatic battery case 21 that is manufactured by the manufacturing method of the embodiments mentioned above. Since the prismatic battery case 21 is manufactured in a small number of steps, productivity is improved accordingly. The prismatic battery case 21 is formed with high precision in its dimensions such as the thickness by the DI method. Thus, when the thickness of this prismatic battery case 21 is made to be as thin as possible, this prismatic battery will have sufficient pressure resisting strength, while pursuing an improvement in energy density per volume. This kind of effect is achieved similarly in the case where the prismatic battery case 9 shown in FIG. 3E is used. However, in a case where the prismatic battery case 21 is used, the sealing plate 22 is supported by the tier portion between the thin wall portion 21c of the prismatic battery case 21 and the other portions during the laser beam welding of the intermeshed portion 23 between the sealing plate 22 and the prismatic battery case 21. There is an advantage in that laser beam welding is carried out easily without any need of means for supporting the sealing plate 22.

Figure 6:
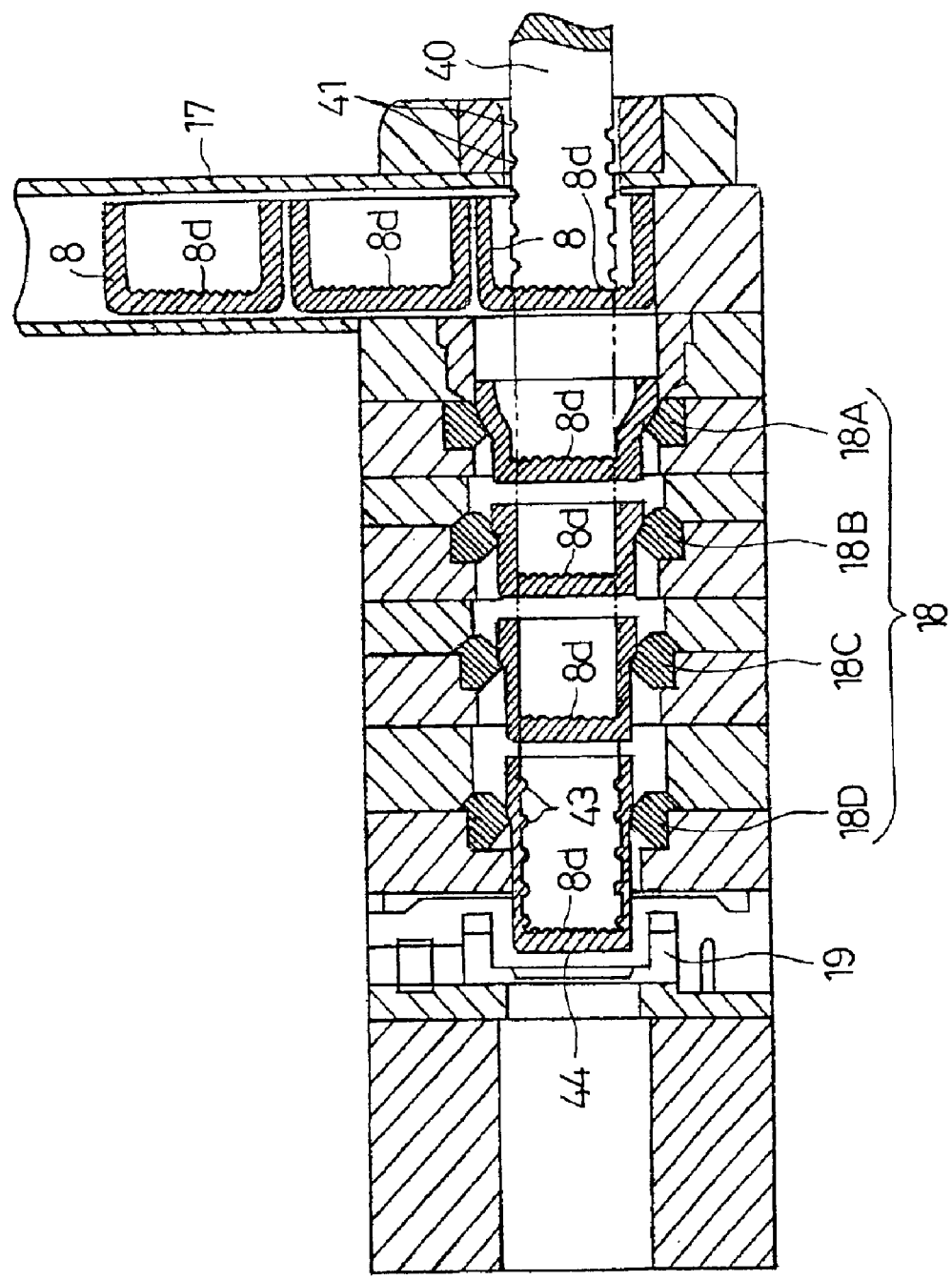
FIG. 6 is a schematic cross sectional view of a second step of a manufacturing method of a prismatic battery case according to a second embodiment of the present invention.
Figure 7A:
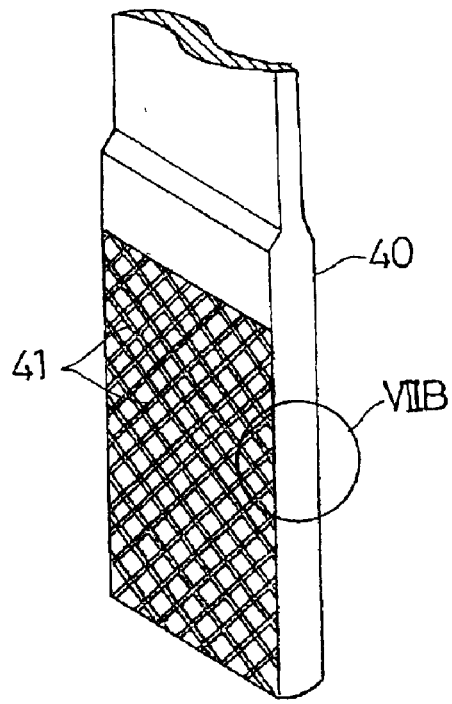
FIG. 7A is a perspective view showing a DI punch used in the second step of the embodiment.
Figure 7B:
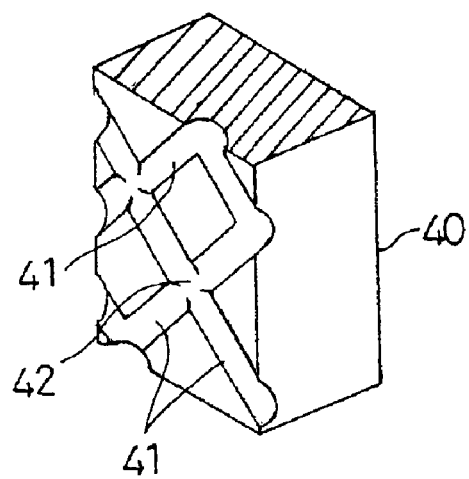
FIG. 7B is an enlarged view of the VIIB portion in FIG. 7A.

A manufacturing method of a prismatic battery case according to a second embodiment of the invention will be explained next. In this manufacturing method, an intermediate cup body 8 similar to the ones in the first embodiment is molded by impact molding in the first step, shown in FIG. 1. This intermediate cup body 8 is DI processed by the drawing and ironing machine in the second step, shown in FIG. 6. In FIG. 6, elements that are the same or similar to the elements in FIG. 2 will be given the same reference symbols, and redundant explanations will be omitted. The only difference between this drawing and ironing machine, and the one shown in FIG. 2 is the constitution of the DI punch 40. That is, the DI punch 40 has an outer shape of prismatic plate form with a cross section of substantially rectangular shape corresponding to the prismatic battery case to be manufactured, as shown in a perspective view of FIG. 7A and FIG. 7B, that is an enlarged view of the VIIB portion of FIG. 7A. There are also processing grooves 41 of lattice form formed on a portion starting from the bottom end up to a prescribed location, on both of the side surfaces on the longer sides. These lattice formed processing grooves 41 are communicatively connected to each other through the intervention of intersections 42, where they intersect with each other.

Figure 8:
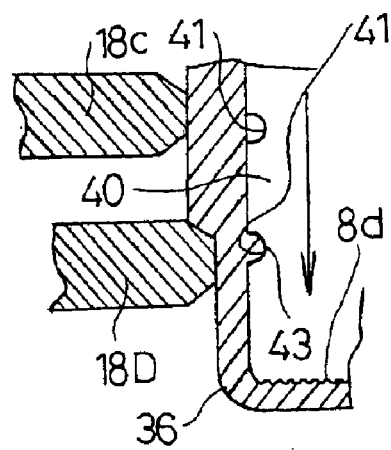
FIG. 8 is a sectional view of a portion showing the case manufacturing process in the second step of the embodiment.

The DI processing in this second step is basically similar to the second step of the first embodiment, and only the dissimilar points will be explained. When the intermediate cup body 8 passes through the drawing die 18A and the first and second ironing dies 18B and 18C, and the drawn and ironed cup body 36 passes through the third ironing die 18D, the inner surface of the cup body 36 is pressed and made strong contact with the outer surface of the DI punch 40 by the pressurizing force of the smallest ironing processing hole of the third ironing die 18D, as shown in FIG. 8. With this pressing contact, a portion of the material on the inner surface side of this cup body 36 is pushed into the processing grooves 41 of the DI punch 40, while being subjected to plastic deformation. This transcribes the processing grooves 41 onto the inner surface of the cup body 36, and convex protruding portions 43 of lattice form is formed, corresponding to the processing grooves 41.

When the convex protruding portions 43 are formed on the inner surface of the cup body 36, the material on the inner surface side of the cup body 36 moves in unity with the DI punch 40 with hardly any processing being done, because it is put in a state with resistance added between itself and the DI punch 40. It is also possible to make the flow of the material smoother, by restraining the material surplus phenomenon from happening between the third ironing die 18D and the DI punch 40, because the material on the outer surface side of the cup body 36 is ironed mainly by the third ironing die 18D. It is also possible to restrain the processing speed at the plate portion on the longer side, thereby making the processing speed constant as a whole, because the convex protruding portions 43 are made to be formed on only the plate portion on the longer side of the cup body 36.

As a result, it is possible to manufacture a prismatic battery case having a uniform thickness without any corrugation on either the inner side or the outer side of the case with this manufacturing method. In other words, when, for instance, the cup body 36 is DI processed with a DI punch of prismatic plate form with its side face on the longer side made planar, the material on the inner surface side and the outer surface side of the cup body 36 are not processed by the DI punch and the ironing die. Thus, the material surplus phenomenon will occur, and corrugations, in which a thickness thinner than the clearance between the DI punch and the die is induced at part of the places, will be generated. When DI processing a prismatic battery case, the processing speed at the plate portion on the longer side becomes faster than the speed at the plate portion on the shorter side, and the plate portion on the longer side is stretched and becomes thinner. However, this kind of problem is dissolved all at once, by adopting the manufacturing method of this embodiment.

Figure 9A:
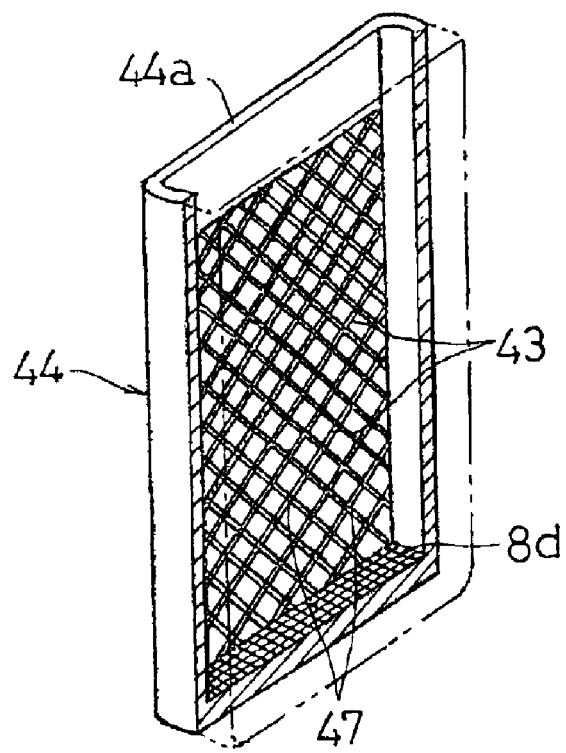
FIG. 9A is a perspective view showing the longitudinal sectional shape of a prismatic battery case of the embodiment.
Figure 9B:
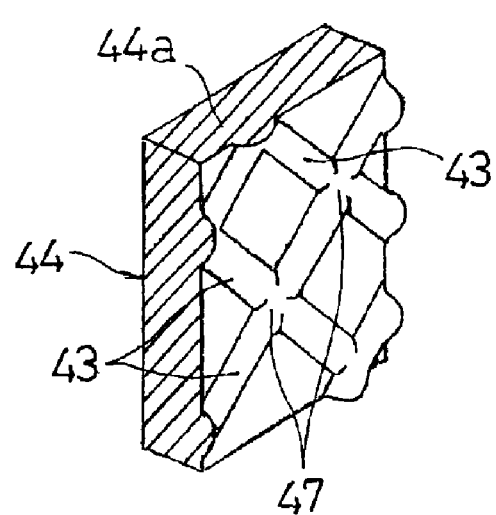
FIG. 9B is a perspective view showing a portion of the inner surface of this battery case in enlarged form.
Figure 9C:
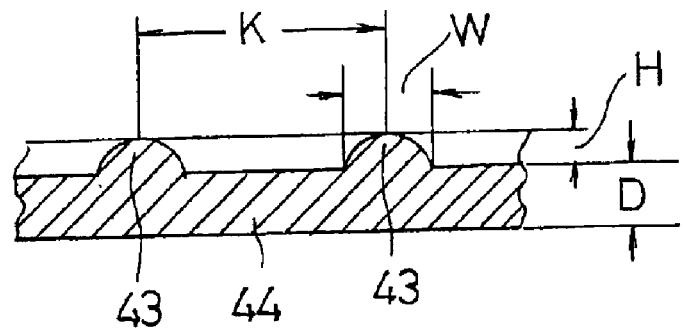
FIG. 9C is an enlarged sectional view of a portion of this battery case.

FIG. 9A is a perspective view showing the longitudinal sectional shape of a prismatic battery case 44 obtained by the manufacturing method of the second embodiment, and FIG. 9B is a perspective view showing a portion of the battery case 44 in enlarged form, and FIG. 9C is an enlarged sectional view of one portion. This prismatic battery case 44 has an outer shape of prism form with a bottom, and has a cross section of rectangular shape. There are also multitudes of convex protruding portions 43 of lattice form, which are similar to the lattice form of the processing grooves 41 of the DI punch 40, formed on the inner surface of the case at the plate portion on the longer side 44a. These convex protruding portions 43 are mutually connected through the intervention of the intersections 47.

This prismatic battery case 44 is made to be as thin as possible, but it has enough strength to effectively restrain an expanding deformation with the lattice formed convex protruding portions 43 functioning just like reinforcement crosspieces to provide extremely high pressure resisting strength. The outer surface and the inner surface of the case are both made to be planes of high precision with no corrugations. Since this prismatic battery case 44 has convex protruding portions 43 linked to each other by the intervention of the intersections 47, there are two directions in which its strength is increased by the convex protruding portions 43, and even stronger pressure resisting strength is achieved.

Specific explanations will follow, with references to FIG. 9C. It is possible to achieve a prescribed effect of effectively restraining the expanding deformation due to a rise in pressure within the battery, while maintaining sufficient energy density, when the convex protruding portions 43 are formed on the inner surface of the battery case, with the height H, width W, and interval K of the protrusion configured to be within the following range of values.

That is to say, it is preferable that the protruding height H of the convex protruding portion 43 is configured to be five to fifty percent of the thickness D of the battery case (the thickness of the plate portion on the longer side 44a in a prismatic battery). When it is less than five percent, there is no restraining effect on the expanding deformation. When it is fifty percent or more, the capacity of the battery case decreases, and this not only incurs a reduction in energy density per volume, but also makes it difficult to manufacture the case, per se. A more preferable protruding height H is to configure it to be a value within a range of five to twenty percent of the thickness D, and the most preferable protruding height H is to configure it to be a value within a range of five to ten percent of the thickness D. A specific numerical value is 0.01 mm to 0.02 mm.

It is preferred that the width W of the convex protruding portion 43 be configured to be within a range of one to thirty times the protruding height H. When it is one time or less, it is not possible to form convex protruding portions 43 that have enough protruding height H to effectively restrain the expanding deformation. When it is thirty times or more, the inner capacity of the battery case decreases, and incurs a reduction in energy density per volume. A more preferable width W is to configure it to be a value within a range of five to twenty times the protruding height H, and the most preferable width W is to configure it to be a value within a range of ten to fifteen times the protruding height H.

It is preferred that the interval K of the convex protruding portion 43 be configured to be within a range of two to twenty times the width W. When it is two times or less, the inner capacity of the battery case decreases, and incurs a reduction in energy density per volume. When it is twenty times or more, the restraining effect of the expanding deformation becomes insufficient. A more preferable interval K is to configure it to be a value within a range of five to fifteen times the width W.

Figure 10A:
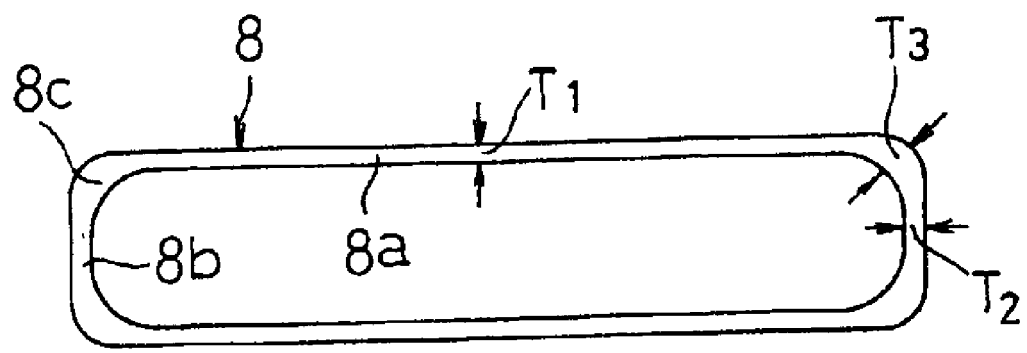
FIG. 10A is a view of an intermediate cup body manufactured by the first step the embodiment, seen from the opening thereof.
Figure 10B:
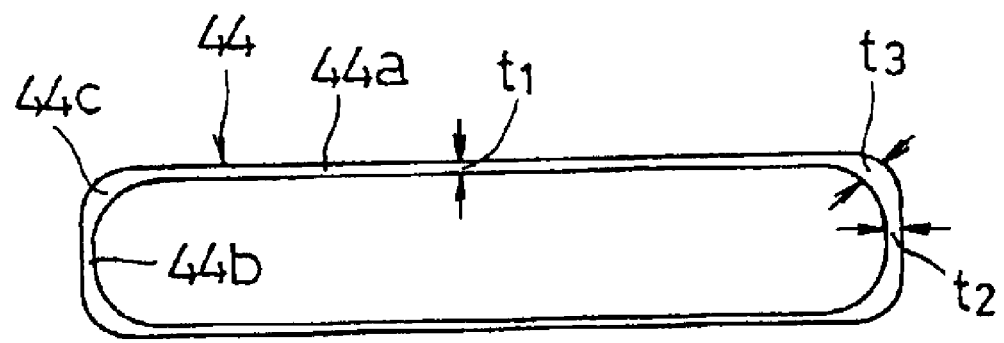
FIG. 10B is a plan view of the prismatic battery case manufactured by being subjected to the second step, seen from the opening thereof.

FIG. 10A is a view of the intermediate cup body 8 manufactured by being subjected to the first step of the manufacturing method of the second embodiment, seen from the opening. FIG. 10B is a view of the prismatic battery case 44 manufactured by being subjected to the second step, seen from the opening. When T1 is the thickness of the plate portion on the longer side 8a, T2 is the thickness of the plate portion on the shorter side 8b, and T3 is the thickness of the corner portion 8c, the intermediate cup body 8 of FIG. 10A has a shape with their relative relation to be T1<T2<T3. To be specific, the thickness T1 of the plate portion on the longer side 8a is 0.40 mm, the thickness T2 of the plate portion on the shorter side 8b is 0.55 mm, and the thickness T3 of the corner portion 8c is 0.75 mm. The thickness of the bottom plate portion is 0.40 mm. The first impact molding has excellent shape selectivity in which it is possible to easily mold a random shape by configuring the gap between the punch 13 and the wall of the processing hole 11a of the die 11, as mentioned above. Consequently, it is possible to manufacture intermediate cup bodies 8 with different thicknesses T1 to T3 at the respective portions, easily and quickly in one step.

An intermediate cup body 8 with the aforementioned shape has all the portions including the plate portion on the longer side 8a, the plate portion on the shorter side 8b, and the corner portion 8C except the bottom plate portion ironed at the same rate when being DI processed at the next step. Thereby, it is possible to obtain a battery case 44 with a prescribed thickness of design, while positively preventing an occurrence of problems such as ruptures or tear-offs.

When t1 is the thickness of the plate portion on the longer side 44a, t2 is the thickness of the plate portion on the shorter side 44b, and t3 is the thickness of the corner portion 44c, the intermediate cup body 44 of FIG. 10B maintains a shape with their relative relation to be t1<t2<t3, similar to the intermediate cup body 8. To be specific, the thickness t1 of the plate portion on the longer side 44a is 0.20 mm, the thickness t2 of the plate portion on the shorter side 44b is 0.30 mm, and the thickness t3 of the corner portion 44c is 0.50 mm. This is a result of having the whole of the peripheral side surfaces of the intermediate cup body 8 molded to be almost uniformly thinner by the DI processing. The thickness of the bottom plate portion remains to be 0.40 mm, which is the same as the intermediate cup body 8.

Consequently, when manufacturing beforehand an intermediate cup body 8 having thicknesses T1 to T3 by impact molding, the controlling to obtain a prismatic battery case 44 with prescribed thicknesses t1 to t3 becomes easy, and the burden of processing also becomes less in the DI processing. In this case, the thicknesses T1 to T3 have ratios corresponding to the ratio of the thicknesses t1 to t3 at each of the portions of the prismatic battery case 44 of desired shape. The bottom plate portion is molded to a prescribed thickness when the case is impact molded in the first step. Since, this thickness does not change through the DI processing, the bottom plate portion is formed to be a prescribed thickness in as few numbers of steps as possible.

In a battery case 44 having the shape mentioned above, when the pressure inside the battery rises, the force that tries to expand and deform the plate portion on the longer side 44a in the outward direction, and the force that tries to sink the plate portion on the shorter side 44b in the inward direction are both acted upon the case simultaneously. Consequently, the plate portion on the shorter side 44b, which has the thickness t2 thicker than the plate portion on the longer side 44a, effectively prevents the plate portion on the longer side 44a from expanding and deforming in the outward direction. The plate portion on the longer side 44a tries to expand and deform in the outward direction using the corner portion 44c just like a fulcrum. Hence, the corner portion 44c, which has the thickness t3 made even thicker than the plate portion on the shorter side 44b, effectively prevents the plate portion on the longer side 44a from expanding and deforming in the outward direction. forming the convex protruding portions 43 of lattice form.

INDUSTRIAL APPLICABILITY

With the prismatic battery case and its manufacturing method of the present invention, it is possible to manufacture a prismatic battery case that has sufficient strength to effectively restrain expansion and deformation due to a rise in pressure within the battery, even when making the thickness of the plate portion on the longer side as thin as possible. It is also possible to manufacture, with good productivity, a prismatic battery case that improves both the energy density per volume and the energy density per weight, in a prismatic battery case with high space utilizing efficiency. Consequently, it is suited for using in a prismatic battery that requires a reduction in size and thickness of the battery case.

What is claimed is:

1. A method for manufacturing a prismatic battery case, comprising:
   a first step for molding an intermediate cup body by impact molding a pellet, wherein said pellet has a shape that, in a plan view, corresponds to an outline of a cross sectional shape of the prismatic battery case; and
   a second step for molding a prismatic battery case with a cross section of a substantially rectangular shape by DI processing said intermediate cup body, the DI processing conducting drawing and ironing continuously in one action
   said intermediate cup body having a bottom face, said intermediate cup being molded by impact molding said pellet using a punch having a jagged surface along a front-end surface, said jagged surface being perpendicular to an axis line of the punch, the punch being adapted for forming a jagged surface throughout said bottom face of said intermediate cup so that the punch and pellet maintain a predetermined positional relationship during said first step.

2. The method for manufacturing a prismatic battery case according to claim 1, wherein:
   the intermediate cup body is molded by impact molding the pellet to have a prismatic shape with a bottom, and a cross section of rectangular shape that satisfies a relation of T1<T2<T3, where thicknesses of a plate portion on a longer side, a plate portion on a shorter side, and a corner portion of the cross section are defined as T1, T2, and T3, respectively; and
   the prismatic battery ease is molded by molding said intermediate cup body with the DI processing to have a shape with a cross section of rectangular shape that satisfies a relation of T1<T2<T3, where thicknesses of a plate portion on a longer side, a plate portion on a shorter side, and a corner portion of the cross section are defined as T1, T2, and T3, respectively.

3. The method for manufacturing a prismatic battery case according to claim 2, wherein:
   the intermediate cup body is molded by impact molding the pellet to have a shape with a ratio of the thickness of a bottom plate portion to the thickness (T1) of the plate portion on the longer side being 0.6 to 1.3, and a ratio of the thickness of the bottom plate portion to the thickness (T2) of the plate portion on the shorter side being 1.0 to 1.8.

4. A prismatic battery, comprising:
   a power generation element including an electrode group and electrolyte solution is accommodated inside a prismatic battery case manufactured by the manufacturing method according to claim 1, and an opening of the case is liquid sealed with a sealing plate;
   said prismatic case having a bottom surface, wherein said bottom surface has a jagged contour throughout.

5. A prismatic battery case, comprising:
   an intermediate cup body, said intermediate cup body having a bottom face, said intermediate cup being molded by impact molding a pellet using a punch having a jagged surface along a front-end surface thereof, said jagged surface being perpendicular to an axis line of the punch, the punch forming a jagged surface throughout said bottom face of said intermediate cup so chat the punch and pellet maintain a predetermined positional relationship;
   said pellets being molded to have a prismatic shape with a bottom and, a cross section of rectangular shape chat satisfies a relation of T1<T2<T3, where thicknesses of a plate portion on a longer side, a plate portion on a shorter side, and a corner portion of the cross section are defined as T1, T2, and T3, respectively; and
   the prismatic battery case is molded by molding die intermediate cup body with DI processing to have a shape with a cross section of rectangular shape that satisfies a relation of T1<T2<T3, where thicknesses of a plate portion on a longer side, a plate portion on a shorter side, and a corner portion of the cross section are defined as T1, T2, and T3, respectively, the DI processing conducting drawing and ironing continuously in one action.

6. A method for manufacturing a prismatic battery case, comprising:
   a first step for molding an intermediate cup body by impact molding a pellet of a prescribed shape; and
   a second step for molding a prismatic battery case with a plurality of convex protruding portions formed in lattice form arrangement extending in linear form on the inner surface of the case, and formed on at least the place portions on the longer sides, so as to be thick in a thickness direction of the case by DI processing said intermediate cup body using a DI punch, the DI processing conducting drawing and ironing continuously, in one action, the DI punch having processing grooves of lattice form formed on at least surfaces on longer sides of a prismatic plate with a cross section of rectangular shape.

7. A prismatic battery, comprising:

a power generation element including an electrode group and electrolyte solution is accommodated inside a prismatic battery case manufactured by the manufacturing method according to claim 6, and an opening of the case is liquid sealed with a sealing plate.

* * * * *